April 19, 1960   C. C. GEIB   2,933,661
RECTIFIER AND METHOD OF MAKING SAME
Filed Aug. 5, 1953   2 Sheets-Sheet 1

Inventor
Clarence C. Geib,
By: Schneider & Dressler,
Attys.

April 19, 1960  C. C. GEIB  2,933,661
RECTIFIER AND METHOD OF MAKING SAME
Filed Aug. 5, 1953  2 Sheets-Sheet 2

Inventor,
Clarence C. Geib,
By: Schneider & Dressler,
Attys.

United States Patent Office 2,933,661
Patented Apr. 19, 1960

2,933,661

RECTIFIER AND METHOD OF MAKING SAME

Clarence C. Geib, Zion, Ill., assignor to Fansteel Metallurgical Corporation, a corporation of New York Application August 5, 1953, Serial No. 372,506

10 Claims. (Cl. 317—234)

This invention relates to a selenium rectifier and to a method of making the same. In particular, the invention relates to a novel rectifier having a pressure insensitive region and method of making the same.

A selenium rectifier consists of a base or carrier plate or electrode having a suitable metallic surface upon which there is disposed a layer of selenium. This layer exists in a suitable crystalline form and has the surface of the selenium remote from the base plate adapted to function as a blocking layer. This blocking layer may either consist of the selenium surface itself or may be created by the application of suitable materials, such as lacquers and other well known materials for providing a blocking layer. A counterelectrode of suitable metal or alloy is disposed over the blocking layer to complete the selenium rectifier.

In use, it is necessary to clamp one or more rectifiers without deleteriously affecting the operating characteristics of said rectifiers. As is well known, the rectifying and blocking characteristics of a selenium rectifier are greatly influenced by the pressure to which the selenium and blocking layer is subjected. Various expedients have been relied upon to desensitize a region on the rectifier, such region taking the clamping pressure for one or more rectifiers. While various means for obtaining such a desensitizing action are known, such means have various drawbacks and usually result in increased manufacturing costs. The invention provides a rectifier having desired desensitized areas and being susceptible to stacking and conventional handling. This invention also provides a method for making selenium rectifiers having desensitized areas.

The invention in general contemplates the use of moisture-free kraft paper for a filler for a part of the region normally occupied by the selenium layer. Because of the purity of kraft paper and the fact that it is unsized, it is unusually effective. Moisture-free kraft paper has excellent adhesive properties in the rectifier. The moisture-free kraft paper is introduced into the assembly at an appropriate stage of the manufacture of the selenium rectifier, the manufacture and processing of the rectifier otherwise proceeding along conventional lines. In order that the invention may be fully understood, it will now be explained in connection with the drawings wherein exemplary embodiments of rectifiers embodying the invention and block diagrams illustrating the new methods of making rectifiers are shown, it being understood that additional modifications may be made without departing from the scope of the invention. Referring to the drawings:

Figure 1:
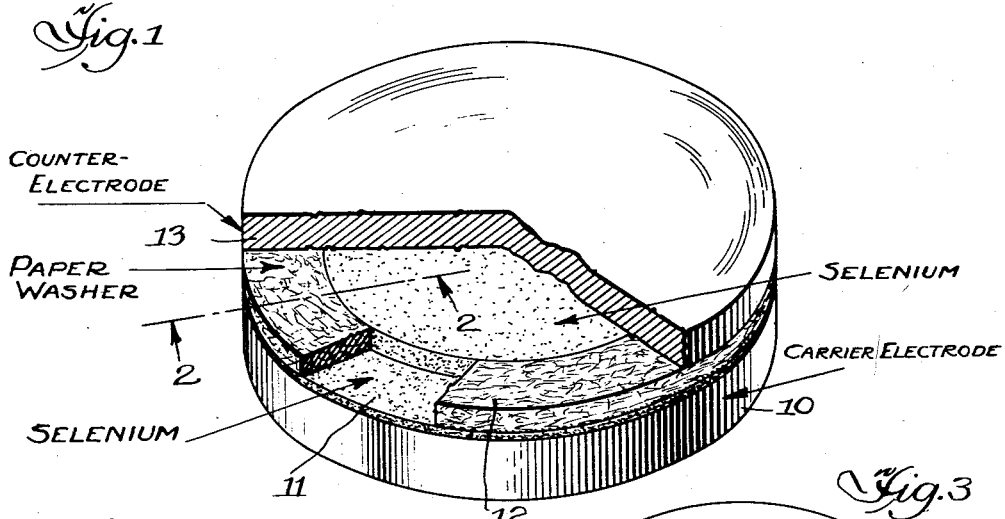
Figure 1 is a perspective view, with certain parts broken away, of one form of disc rectifier embodying the present invention.
Figure 2:
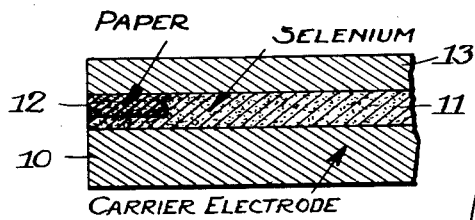
Figure 2 is a detail of the rectifier illustrated in Figure 1.

Referring first to Figures 1 and 2, carrier electrode 10 is of suitable metal, such as iron or other metal having a top surface suitably roughened. Disposed on carrier electrode 10 is layer 11 of crystalline selenium, this material being in its gray crystalline form. Disposed between the top and bottom surfaces of selenium layer 11 is annular washer 12 of moisture-free kraft paper. The thickness of paper washer 12 is preferably somewhat less than the thickness of selenium layer 11 in the final product. As will be apparent later in connection with the description of the method of making the rectifier, some selenium will be present on one or the other, or both sides, of paper washer 12 in the finished product, as well as in the pores of the paper. As shown in Figures 1 and 2, a thin layer of selenium exists under paper washer 12 and, in practice, some selenium will penetrate into the pores of the paper. This penetration makes for a good bond between the paper and selenium. Instead of there being some selenium below paper washer 12, as illustrated in Figure 2, it is possible to have paper washer 12 resting directly upon carrier electrode 10 and have the selenium layer 11 extend over the top of paper washer 12.

Above selenium layer 11 and washer 12 is a conventional counterelectrode 13. This is usually sprayed on. A mixture of antimony and bismuth is frequently used as a counterelectrode although other metals and alloys may be used.

The thicknesses of the electrodes and selenium layer have values customary in the art. As is well known, the carrier electrode is usually heavy enough to be self-supporting, while the selenium and counterelectrode layers are comparatively thin. It will therefore be understood that the thickness of carrier electrode 10 is not necessarily shown in proper proportions in the drawings.

Between the selenium layer and the counterelectrode layer, there may be the customary blocking layer of extreme thinness, all this being well known in the art and not requiring illustration. The rectifier illustrated in Figures 1 and 2 is disc-shaped and is adapted to be compressed or clamped at an annular zone at the edge of the assembly. A portion of the rectifier within the inner borders of the paper washer will be free of clamping pressure, thus leaving the active portion of the rectifier with unimpaired electrical characteristics.

Instead of having circular outlines for the electrodes, other shapes may be used such as, for example, rectangular or square shapes. It is also possible to omit a portion of the paper washer and rely upon a small length of washer for providing a region for clamping. Thus, in the case of a rectangular rectifier, the paper washer may be replaced by a paper strip extending along one dimension of the rectangle.

Figure 3:
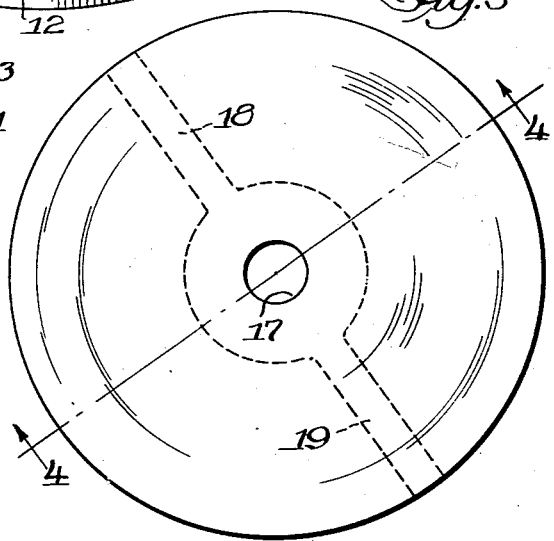
Figure 3 is a plan view of a modified form of rectifier embodying the present invention.
Figure 4:
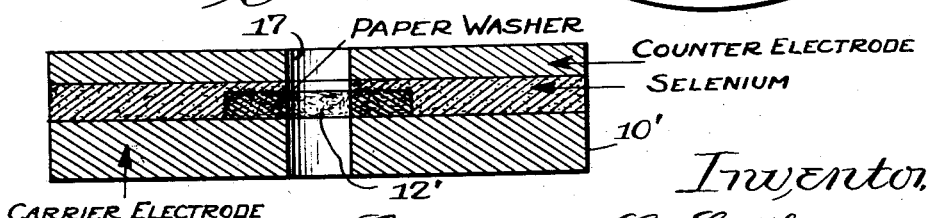
Figure 4 is a section on line 4—4 of Figure 3.

Referring to Figures 3 and 4, the same general form of rectifier is shown with the exception that the rectifier is provided with central aperture 17 for stack mounting around a rod or bolt. It is understood, of course, that the bolt will have suitable insulating means to prevent short-circuiting of any rectifier unit. In the rectifier illustrated in Figures 3 and 4, moisture-free kraft paper washer 12' is disposed immediately around aperture 17 of the rectifier the paper washer in this modification resting directly upon carrier electrode 10'. Paper washer 12' has diagonally disposed, outwardly extending arms 18 and 19. The finished rectifier has these washer arms in connection with the method of manufacturing the same, to be described later.

In certain instances where large rectifier areas may be necessary and where mechanical considerations require, the construction shown in Figures 1 and 3 may be combined so that both marginal and central clamping may be used. Thus, a central aperture with a moisture-free kraft paper washer, as illustrated in Figures 3 and 4, may be incorporated in the construction shown in Figure 1. In such a modified form of structure, washer arms 18 and 19 will join the inner and outer washers.

The manufacture of the rectifiers illustrated in Figures 1 to 4 inclusive involves the introduction of moisture-free kraft paper at certain points in the entire manufacturing process. Generally, rectifiers, such as illustrated in Figures 1 to 4 inclusive, are formed as large sheets and the individual rectifier assemblies are thereafter punched out.

Figure 5:
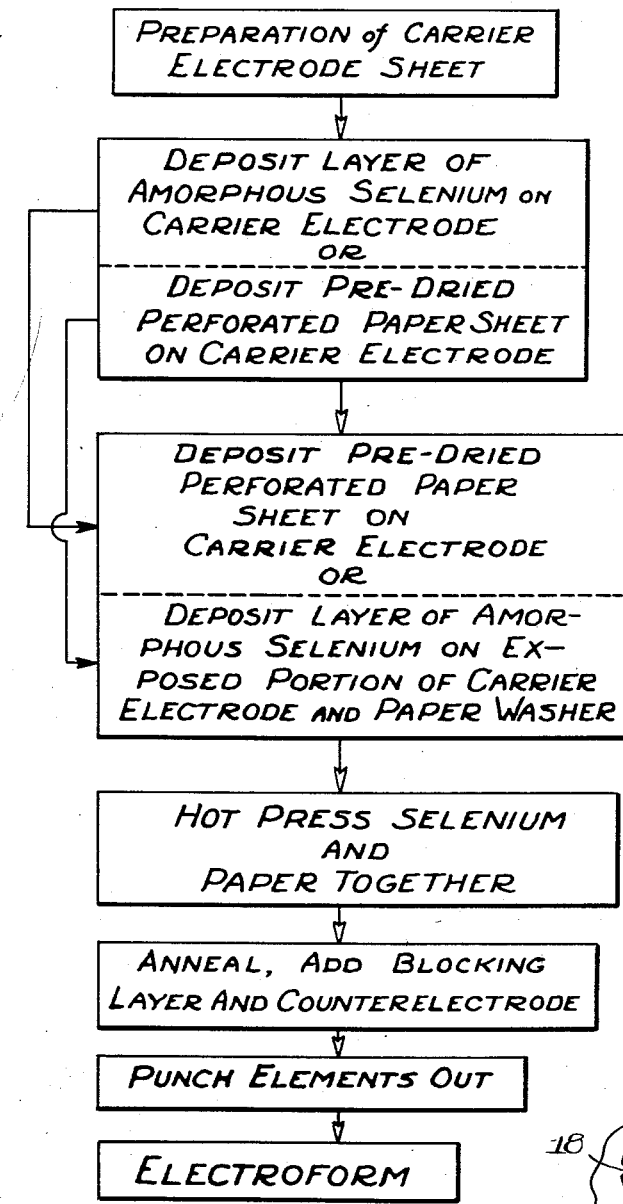
Figure 5 is a block diagram illustrating the various steps in the new method of making a rectifier, the block diagram illustrating two modifications.
Figure 6:
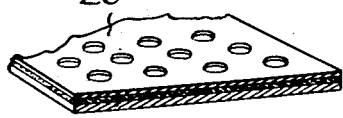
Figures 6 and 7 are details illustrating the paper sheets used to manufacture the two forms of rectifiers of Figures 1 and 3 respectively.

Referring to Figure 5, a carrier electrode sheet having any desired extent and shape in suitably prepared to receive the selenium. This process is generally well known and involves the obtaining of a roughened, chemically clean surface of iron or other metal to which selenium will attach. In the rectifier shown in Figures 1 and 2, a layer of amorphous selenium is sprinkled upon the carrier electrode sheet. Thereafter, an apertured sheet of moisture-free kraft paper is disposed on the selenium, it being understood that the apertures form the apertures for the washers. Sheet 20 in Figure 6 is of kraft paper and is preferably between .003 and .005 inch thick. However, kraft paper having a greater or smaller thickness may be employed. Prior to the application of the paper, the paper sheet is preferably dried for a short time to remove as much moisture as possible therefrom. Drying the paper for between about 10 and about 15 minutes at a temperature from about 50° C. to 100° C. will generally suffice. However, when paper contains an unusually larger or smaller amount of moisture than is normally present, a different drying time or temperature may be used. In any event, the paper should not be heated to such a high temperature as to char. The drying operation eliminates the possibility of wrinkles forming in the paper during hot pressing and insures excellent adhesion of the paper to the selenium and carrier electrode. It is understood that sufficient amorphous selenium is provided so that a selenium layer at least as thick as, and preferably somewhat thicker than, the paper is provided at the regions free of paper.

The carrier electrode sheet, selenium and paper are now subjected to a hot-press operation. During this press operation, the selenium is heated so that it softens. As an example, the hot press may be carried on at a temperature of about 125° and 150° C. and at a pressure of about 2,000 pounds per square inch. These figures are exemplary only and may be modified as conditions require. The selenium will flow around and over and under the paper, depending on various factors. Some selenium will enter the pores of the paper, thus mechanically bonding the paper to the selenium. The hot-press operation is carried out in a normal manner well known in this art, and tends to form a uniform layer of selenium and to anchor the paper tightly and intimately to the selenium.

After the hot press, the customary heat treatment for annealing the selenium and transforming the same to a gray crystalline state is provided. Thereafter, a blocking layer may be created, and a counterelectrode sprayed on or applied in any other desired manner. The individual rectifiers may be punched out of the sheet, then the individual rectifiers may be electroformed in any well known manner.

The process so far described may be modified somewhat to have the paper resting directly on the carrier electrode, as illustrated in Figures 3 and 4. It is necessary to apply the dried paper sheet to the carrier electrode sheet prior to the application of the selenium powder in amorphous form. In other words, as illustrated in the diagram in Figure 5, the paper, after having been properly dried, is applied on the cleaned carrier electrode sheet, then amorphous selenium is sprinkled over the entire area of the sheet electrode and paper washer. The remaining steps of hot press and subsequent steps are the same as previously described.

It is also possible to apply some amorphous selenium to the carrier electrode sheet, then apply dried paper washers, and thereafter apply some more amorphous selenium. This modification would result in having the paper washers between thin layers of selenium.

Figure 7:
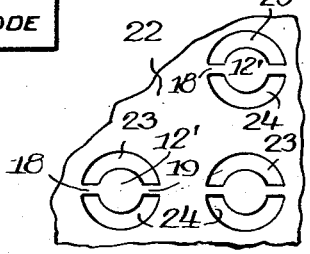

For manufacturing the apertured rectifier as illustrated in Figures 3 and 4, paper sheet 22, illustrated in Figure 7, is used. Sheet 22 has regions 23 and 24 punched out, leaving central washers 12' and washer arms 18 and 19 for each washer. These arms retain the individual washers on the sheet. Thereafter, the punching step leaves the individual rectifiers as illustrated in Figures 3 and 4.

If both inner and outer washers are desired, the paper sheet may be punched out so that an outer paper rim will be provided on each rectifier unit.

Sheet 22 may have selenium above, below, or on both sides thereof.

What is claimed is:

1. In the manufacture of a selenium rectifier, the steps which comprise disposing a sheet of moisture-free predried, kraft paper having a number of apertures punched therethrough and a layer of amorphous selenium on a carrier electrode and hot pressing the same at a temperature sufficient to soften the selenium and cause it to flow, forming an integral layer of substantially uniform thickness of selenium and moisture-proof paper, annealing the selenium to transform it to a gray crystalline state, continuing in conventional manner until individual rectifiers are punched out, and thereafter punching the rectifiers out so that the apertures originally in the paper are generally symmetrical with the edges of the individual rectifiers, each individual rectifier having a moisture-free kraft paper washer forming a generally annular pressure assuming portion.

2. The steps according to claim 1, wherein the kraft paper is disposed directly over a part of the carrier electrode, and thereafter amorphous selenium is disposed over the kraft paper and carrier electrode.

3. The steps according to claim 1, wherein the amorphous selenium is first disposed over the entire surface of the carrier electrode, after which the kraft paper is disposed on the selenium to overlie a portion of the carrier electrode.

4. In the manufacture of selenium rectifiers, the steps which comprise covering a sheet metal member of carrier electrode material with a sheet of moisture-free kraft paper having a number of apertures punched therethrough, disposing amorphous selenium powder over the paper and carrier metal member, hot-pressing the paper and selenium at a temperature and pressure sufficient to soften the selenium and cause it to flow, forming an integral layer of uniform selenium and moisture-free kraft paper, annealing the selenium to transform it to a grey crystalline state, continuing in conventional manner until individual rectifiers are to be punched out, and thereafter punching the rectifiers out so that the apertures originally in the paper are generally symmetrical with the edges of the individual rectifiers, each individual rectifier having a moisture-free kraft paper washer forming a generally annular pressure assuming portion.

5. The steps according to claim 4, wherein said kraft paper sheet has a number of curved apertured regions for each rectifier to be later punched out, the punching step leaving a central kraft paper washer having outwardly extending arms for each rectifier.

6. A selenium rectifier having carrier and counter electrodes between which a layer of selenium is disposed, and a piece of smooth moisture-free kraft paper is disposed between said electrodes to provide a limited region where the rectifier may be clamped without affecting the operating characteristics thereof, said kraft paper being integral with the selenium layer, having selenium pressed into the pores of at least one face thereof to mechanically bond the kraft paper to the selenium layer, and having a thickness less than the thickness of the selenium layer, said rectifier having an aperture therethrough for clamping purposes, said kraft paper being shaped as a washer and disposed immediately around said mounting aperture in the region between said electrodes, said washer having outwardly extending arms.

7. A selenium rectifier having carrier and counter electrodes between which a layer of selenium is disposed, and a piece of smooth moisture-free kraft paper is disposed between said electrodes to provide a limited region where the rectifier may be clamped without affecting the operating characteristics thereof, said kraft paper being integral with the selenium layer, having selenium pressed into the pores of at least one face thereof to mechanically bond the kraft paper to the selenium layer, and having a thickness less than the thickness of the selenium layer, said rectifier having an aperture therethrough for clamping purposes, said kraft paper being shaped as a washer and disposed immediately around said mounting aperture in the region between said electrodes, said washer having outwardly extending arms and being in direct contact with one of said electrodes.

8. A selenium rectifier having carrier and counter electrodes between which a layer of selenium is disposed, and a piece of smooth moisture-free kraft paper is disposed between said electrodes to provide a limited region where the rectifier may be clamped without affecting the operating characteristics thereof, said kraft paper being integral with the selenium layer, having selenium pressed into the pores of at least one face thereof to mechanically bond the kraft paper to the selenium layer, and having a thickness less than the thickness of the selenium layer, said rectifier having an aperture therethrough for clamping purposes, said kraft paper being shaped as a washer and disposed immediately around said mounting aperture in the region between said electrodes, said washer having outwardly extending arms and being in direct contact with the carrier electrode.

9. In the manufacture of selenium rectifiers, the steps which comprise depositing a layer of amorphous selenium on a carrier electrode, covering said layer of amorphous selenium with a sheet of moisture-free kraft paper having a number of apertures punched therethrough hot-pressing the paper and selenium at a temperature and pressure sufficient to soften the selenium and cause it to flow thereby forming an integral layer of uniform thickness of selenium and moisture-free kraft paper and then annealing the selenium to transform it to a gray crystalline state, continuing in a conventional manner until individual rectifiers are punched out, and thereafter punching the rectifiers out so that the apertures originally in the paper are generally symmetrical with the edges of the individual rectifiers, each individual rectifier having a moisture-free kraft paper washer forming a generally annular pressure-assuming portion.

10. The steps according to claim 9 wherein said kraft paper sheet has an annular apertured region for each rectifier to be punched out, the punching step leaving a kraft paper washer in the region of the perimeter of each of said rectifiers.

References Cited in the file of this patent

UNITED STATES PATENTS

| | | |
|---|---|---|
| 2,314,104 | Richards et al. | Mar. 16, 1943 |
| 2,434,960 | Richards | Jan. 27, 1948 |
| 2,444,255 | Hewlett | June 29, 1948 |
| 2,444,430 | Denmark | July 6, 1948 |
| 2,480,124 | Driver | Aug. 30, 1949 |
| 2,543,678 | Tumulo | Feb. 27, 1951 |
| 2,637,771 | Tumulo | May 5, 1953 |
| 2,752,542 | Nitsche | June 26, 1956 |